C. J. MANNING.
SAFETY VALVE.
APPLICATION FILED OCT. 14, 1916.
1,236,583.
Patented Aug. 14, 1917.
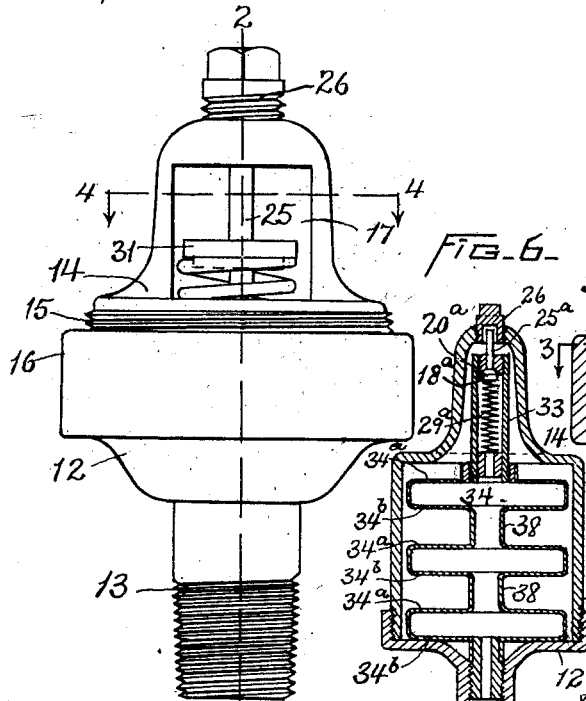
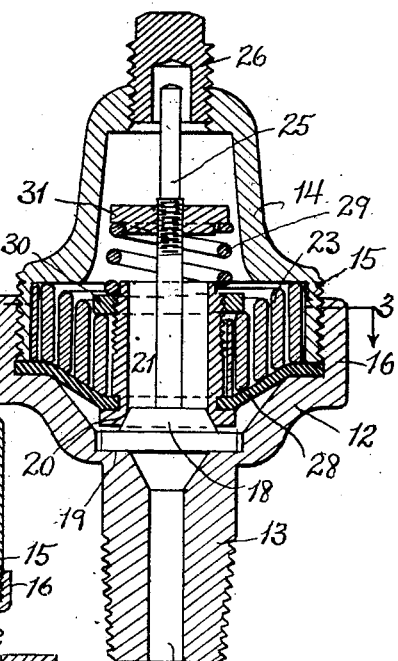
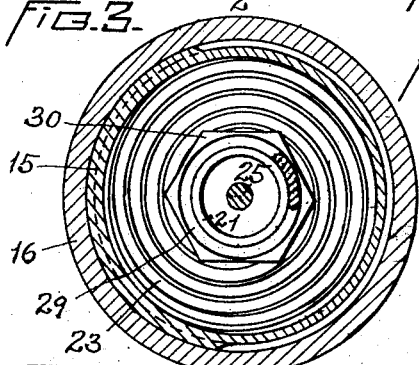
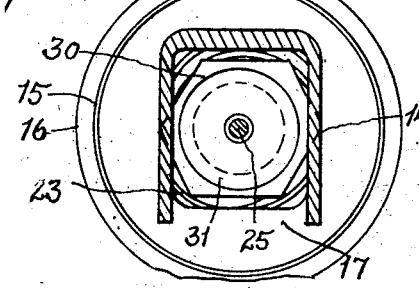
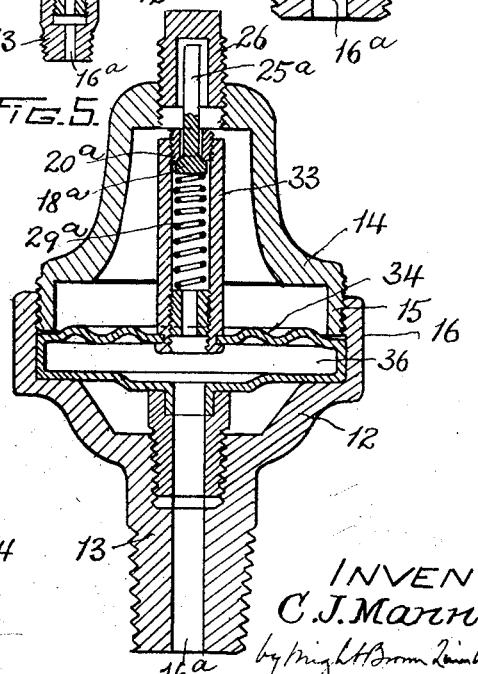
INVENTOR
C. J. Manning
by Wright, Brown, Quinby & May
ATT'YS

UNITED STATES PATENT OFFICE.

COLEMAN J. MANNING, OF MEDFORD, MASSACHUSETTS.

SAFETY-VALVE.

1,236,583. Specification of Letters Patent. Patented Aug. 14, 1917.

Application filed October 14, 1916. Serial No. 125,736.

*To all whom it may concern:*

Be it known that I, COLEMAN J. MANNING, a citizen of the United States, residing at Medford, in the county of Middlesex and State of Massachusetts, have invented new and useful Improvements in Safety-Valves, of which the following is a specification.

This invention has for its object to provide a safety valve the valve seat and the valve member or body of which are movable or displaceable conjointly by an increment of the fluid pressure controlled by the valve and are held in coacting relation to each other by resilient means until the displacement of the valve body is arrested, and the valve is permitted, by its further displacement, to separate from the valve body until the pressure is suitably reduced.

The invention is embodied in the improvements hereinafter described and claimed.

Of the accompanying drawings forming a part of this specification:

Figure 1 represents a side elevation of a valve embodying my invention;

Fig. 2 represents a section on line 2—2 of Fig. 1;

Fig. 3 represents a section on line 3—3 of Fig. 2;

Fig. 4 represents a section on line 4—4 of Fig. 1;

Figs. 5 and 6 represent sectional views of modifications.

The same reference characters indicate the same or similar parts in all the views.

Referring first to Figs. 1 to 4 inclusive, the valve casing is preferably composed of an inner member 12 having a threaded nipple 13 adapted to be engaged with a container of fluid under pressure, and an outer member 14 having an externally threaded flange 15 engaged with an internally threaded flange 16 on the member 12. Said members constitute a conduit having an inlet 16ª formed in the member 12, and an outlet 17 formed in the member 14. 18 represents a valve member or body exposed to fluid pressure at the inlet end of the casing and normally bearing on a stop shoulder forming a valve seat 19 within the member 12.

20 represents a floating valve seat which is preferably an annulus having a beveled internal face conforming closely to the beveled external face of the valve body. As here shown the valve seat is provided with a tubular shank 21 formed integral therewith.

The valve seat 20 and valve body 18, when free from fluid pressure, normally gravitate to the position shown by Fig. 2. Resilient means, preferably embodied in a volute spring 23 of approximately conical formation, arranged normally to exert little or no downward pressure on the valve seat 20 and, through the latter, on the valve body, lends resistance to upward or outward movement of the floating valve seat and the valve body, or, in other words, tends to keep the valve 18 from leaving fixed seat 19, for the spring 23 is brought into action as soon as the valve body begins upward movement.

When the fluid pressure is insufficient to overcome the resistance of the spring 23, the valve seat 20 and valve body remain in the position shown by Fig. 2. An increment of pressure displaces the seat 20 and body 18 outwardly from said position without separation of said parts. I have provided means for arresting or limiting the outward displacement of the valve body before the valve seat 20 reaches the outward extreme of its movement, and when the movement of the valve body 18 is thus arrested the continued movement of the valve seat 20 causes its separation from the valve body and permits the escape of fluid until the pressure is reduced.

I here show said means embodied in a stem 25 attached to the valve body and extending through the tubular shank 21 into the casing member 14, and a stop 26 secured to the member 14 and located in the path of the stem, said stop being preferably a screw-threaded plug engaged with a tapped orifice in the member 14, and adjustable by rotation to arrest the stem at any desired point.

When the displacement of the stem is arrested, a continued displacement of the valve seat 20 separates the latter from the valve body so that fluid is permitted to pass through the casing and escape at the outlet 17. When however the valve body is seated on the valve seat 20 so that the two coact, the passage of fluid through the casing is prevented by means provided for that purpose and preferably embodied in a flexible annular diaphragm 28 engaged at its outer edge with the casing and at its inner edge with the valve seat 20, as indicated by Fig. 2. Said diaphragm may be made of frictioned textile fabric or of any other suitable material, and is sufficiently flexible to conform to one end of the spring 23, as shown. The spring 23 affords substantial lateral support to the diaphragm when the latter is under fluid pressure. This permits the use of a light and flexible diaphragm for high pressures. By decreasing the number of convolutions of the spring 23, the lateral support for the diaphragm will be diminished and the diaphragm will be more responsive. The same effect could be obtained by using a spring of thinner stock. On the other hand, by thickening the spring the support given to the diaphragm would be increased and the diaphragm would be less responsive.

The diaphragm moves with the valve seat and maintains a fluid-tight flexible connection between said valve seat and casing so that there can be no escape of fluid until the valve body is arrested by the stop 26 and the valve seat separates from the valve body.

To normally hold the valve body against the valve seat 20 I provide a light auxiliary spring 29 interposed between inner and outer abutments 30, 31, which may be nuts screwed respectively on the tubular shank 21 and the stem 25.

In the modification shown by Fig. 5 the valve seat 20ª is a tube having a screw thread or other engagement with one end of a tube 33, the other end of which is secured to an annular resilient metal diaphragm 34 forming one side of a chamber the margin of which is engaged as shown with the casing.

The valve body 18ª having a stem 25ª is held against the valve seat by an auxiliary spring 29ª.

The resilient diaphragm 34 is a substitute for the spring 23 and for the diaphragm 28, and not only holds the valve seat 20ª yieldingly against the valve body 18ª but also prevents the passage of fluid through the casing while the valve seat and valve body coact.

When the diaphragm 34 is displaced outwardly by a predetermined increment of fluid pressure, the stem 25ª strikes the stop 26 and is arrested thereby with the result already described. The bottom of the chamber 36, of which the diaphragm 34 forms a part, is seated on the member 12 and communicates as shown with the inlet 16ª.

Fig. 6 shows another modification, in which a plurality of resilient diaphragms 34ª 34ᵇ are provided, these collectively performing the functions of the diaphragm 34. Said diaphragms 34ª and the companion diaphragms 34ᵇ form parts of a series of chambers, which are connected by tubes 38. The bottom diaphragm of the lower chamber is seated on the member 12 and communicates with the inlet 16ª. The top diaphragm of the upper chamber is engaged with the tube 33.

Having described my invention, I claim:

1. A safety valve comprising a casing forming a conduit having an inlet and an outlet and having a shoulder forming a fixed valve seat at the inlet, a floating valve seat between said fixed seat and the outlet, a valve body arranged to coact with both said valve seats but movable bodily from said fixed valve seat and with said floating valve seat by fluid pressure at the inlet sufficient to displace the valve body and the floating valve seat, and means for limiting the displacement of the valve body from said fixed seat and permitting the separation of the floating seat bodily from said valve body, means being provided for preventing the passage of fluid through the casing when the valve body coacts with the floating seat.

2. A safety valve comprising a casing forming a conduit having an inlet and an outlet and having a shoulder forming a fixed valve seat at the inlet, a floating valve seat between said fixed seat and the outlet, a valve body arranged to coact with both said valve seats but movable bodily from said fixed valve seat and with said floating valve seat by fluid pressure at the inlet sufficient to displace the valve body and the floating valve seat, means for limiting the displacement of the valve body from said fixed seat and permitting the separation of the floating seat bodily from said valve body, and a flexible annular diaphragm engaged at its inner edge with said floating valve seat and at its outer edge with said casing to prevent the passage of fluid through the casing when the valve body coacts with said floating valve seat.

3. A safety valve comprising a casing forming a conduit having an inlet and an outlet and having a shoulder forming a fixed valve seat at the inlet, a floating valve seat between said fixed seat and the outlet, a valve body arranged to coact with both said valve seats but movable from said fixed valve seat and with said floating valve seat by fluid pressure at the inlet sufficient to displace the valve body and the floating valve seat, means for limiting the displacement of the valve body from said fixed seat and permitting the separation of the floating seat from said valve body, a flexible annular diaphragm engaged at its inner edge with said floating valve seat and at its outer edge with said casing to prevent the passage of fluid through the casing when the valve body coacts with the floating valve seat, and a volute spring adapted to yieldingly confine the valve seat and diaphragm against said fluid pressure.

In testimony whereof I have affixed my signature.

COLEMAN J. MANNING.